Aug. 23, 1949.  P. J. M. T. ALLARD  2,479,893
MULTIPLE WHEEL ARRANGEMENT AND
SUSPENSION DEVICE THEREFOR
Filed Dec. 22, 1945  3 Sheets-Sheet 1
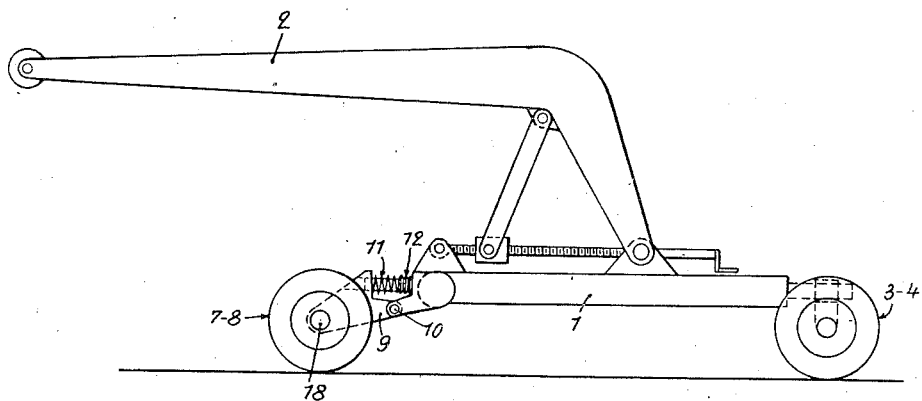
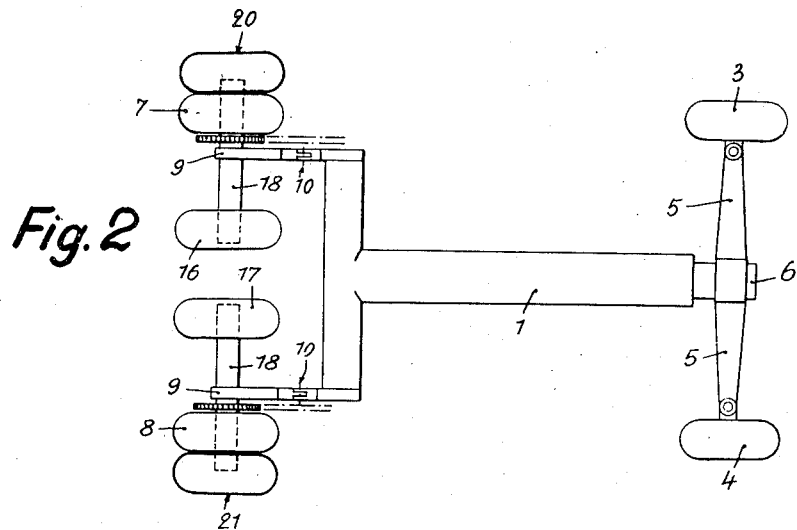
INVENTOR
PIERRE JEAN MARIE THEODORE ALLARD
BY Otto Munk
HIS ATT'Y INVENTOR
PIERRE JEAN MARIE THEODORE ALLARD
BY Otto Munk
HIS ATTY Aug. 23, 1949.  P. J. M. T. ALLARD  2,479,893
MULTIPLE WHEEL ARRANGEMENT AND
SUSPENSION DEVICE THEREFOR
Filed Dec. 22, 1945  3 Sheets-Sheet 3

INVENTOR
PIERRE JEAN MARIE THEODORE ALLARD
BY Otto Munk
HIS ATTY.

Patented Aug. 23, 1949

2,479,893

UNITED STATES PATENT OFFICE 2,479,893

MULTIPLE WHEEL ARRANGEMENT AND SUSPENSION DEVICE THEREFOR

Pierre Jean Marie Theodore Allard, Chantilly, France

Application December 22, 1945, Serial No. 636,609
In France September 30, 1944

Section 1, Public Law 690, August 8, 1946
Patent expires September 30, 1964

4 Claims. (Cl. 180—21)

1

The present invention has for its object a suspension device for vehicles, in particular for vehicles intended for the transport of heavy loads, and more especially for wagons carrying a movable jib of the type described in the French patent application No. 479,656 filed by the applicant on May 26, 1943, entitled "Suspension and steering device for wagons and other vehicles."

This invention is more especially concerned with the suspension of the carrier and driving-wheels; the suspension of the steering wheels may be carried out as described in the French application for patent filed by the applicant on May 16, 1944, under No. 491,106 entitled "Improvements in trailers having steerable forward gear and other vehicles" in which event the vehicle comprises a highly rigid frame, preferably tubular and T-shaped, supporting on one end thereof a shaft on which is pivotally mounted the suspension device for the steering wheels.

According to the invention each driving wheel is supported by a lever connected to the frame through two resilient suspension members arranged in series, one of which is intended to be operative under no-load conditions, to ensure a resilient suspension in road travel and the other becoming operative only when the vehicle is loaded, after the other has been completely distorted.

For example, the resilient suspension device may be constituted by helical compression springs connected in series with another more rigid resilient device (for example a pile of Belleville washers, a spring or a rubber block) which becomes operative only after the first-mentioned helical spring has been entirely compressed.

In this manner the driving wheels are mounted on double acting suspension devices, ensuring ideal suspension whether the frame be loaded or not.

According to a further feature of the invention, each driving wheel is coupled in twin relationship with a free carrier wheel mounted on a balancing bar which may swing about a fulcrum near the centre point thereof at the end of a lever connected to the frame through the resilient suspension referred to above, such an arrangement making it possible to reduce the dimensions of the wheels for a given load.

The lever-arms of the driving and carrier wheels with respect to the swinging-fulcrum of the balancing arm are so selected as suitably to transfer the load, so that the driving wheels proper will at all times be slightly more heavily loaded than the carrier wheels, and will, in all cases offer sufficient adhesion to the ground to draw the vehicle along.

The whole device is so constructed as to comply with road regulations with respect to its dimensions, however, when the crane is supposed to handle particularly heavy loads at the workyard or at loading and unloading points, additional loose removable or retractable wheels may be added to the drive-wheels so as further to reduce the strain on the latter while at the same time increasing the transverse stability.

Further features of the invention will be made clear from the following description, referring to the accompanying drawing which shows by way of example, one embodiment of the invention and wherein:

Fig. 1 is a diagrammatic general view in side elevation of the vehicle;

Fig. 2 is a plan;

Figure 3:
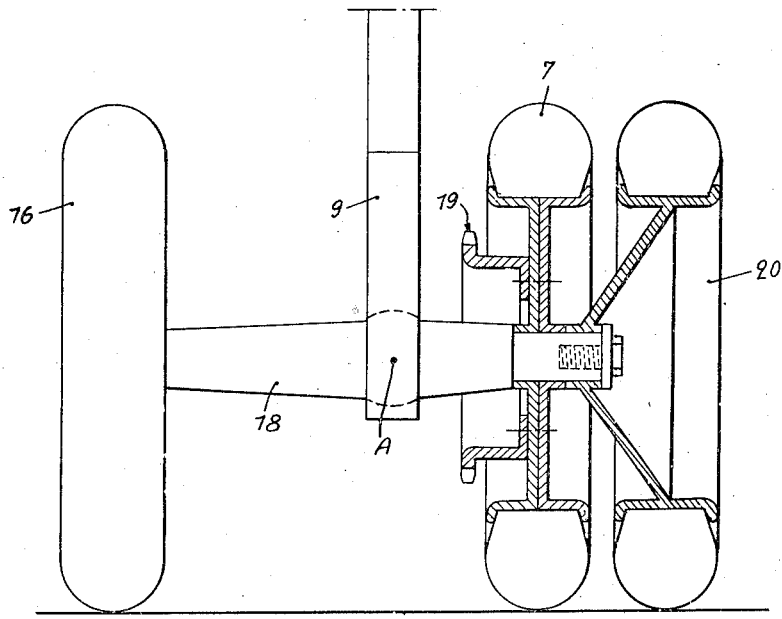
Fig. 3 is a view to a larger scale of a couple of driving and carrier-wheels.

With reference to the drawing, the index numeral 1 designates the frame of the car, such as a highly rigid tubular T-shaped frame on which is mounted a crane with a movable jib 2, as described in the above mentioned application of May 26, 1943.

The steering-wheels 3 and 4 are carried for example by a frame 5 adapted to swing about an axle 6 arranged at the end of the frame, as described in the afore-mentioned application of May 16, 1944.

Figure 4:
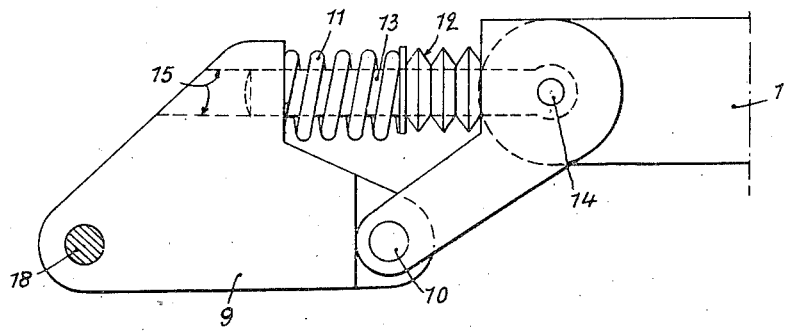
Fig. 4 is a detail of the double-acting resilient suspension device.

The suspension of the drive-wheels 7, 8 which constitute the present invention is effected as follows:

Each of such wheels is carried by a lever 9 hinged at 10 on the frame (Fig. 4).

The levers 9 are connected to the frame 1 through two shock-absorbing or resilient devices arranged in series and constituted by rubber blocks, Belleville washers or springs 11 and 12, selected in such a way as to cause spring 11 to operate when the vehicle is running without a load and spring 12 to operate only when spring 11 is totally compressed, the vehicle being loaded. Preferably the whole device is supported by a rod 13, hinged on the frame about an axis 14 and slidably mounted in a guide 15 of the lever 9.

In order to relieve the driving-wheels, the same are preferably twinned with the carrier-wheels 16, 17 (Fig. 2). In each couple of wheels the carrier-wheel 16 and the driving wheel 7 are mounted loose on a single shaft 18 oscillating in the support 9 about a point A (Fig. 3) so located that the distribution of the load on the carrier- and driving-wheels will be the most satisfactory, namely that the latter will at all times be more heavily loaded than the former so as to provide sufficient adhesion to ensure satisfactory propulsion of the vehicle. The said shaft 18 forms arms of different lengths, the leverage of the shaft arm carrying the said driving wheel being shorter than the leverage of the shaft arm carrying the said loose carrier wheel.

The driving-wheels 7, 8 are driven by any suitable means, such as a sprocket-wheel 19 fixed on the hub of the wheel.

When the crane is supposed to be subjected to very heavy loads, such as at a building-yard or at loading or unloading points, the carrier-wheels 16, 17 and especially the driving-wheels 7, 8 may be subjected to considerable overloading. So as to avoid overloading the driving-wheels these may be supplemented by additional wheels 20, 21 loosely rotatably mounted on the end of shaft 18. Due to the fact that the wheels 20, 21 are loosely mounted on the shaft 18, they have no action regarding the driving of the vehicle which is only controlled by the driving wheels 7, 8 independently of said loose wheels 20, 21. Such wheels 20, 21 are however readily removable whereby the vehicle may be brought back to the dimensions required by road-regulations for travel by road. The addition of these wheels permits of increasing lateral stability of the crane when the same is under load. When the wheels 20, 21 are removed, the wheels 7, 8 are held in place on the shaft 18 by means of an auxiliary hub (not shown) having the same dimensions as the hub of the wheels 20, 21.

Figure 5:
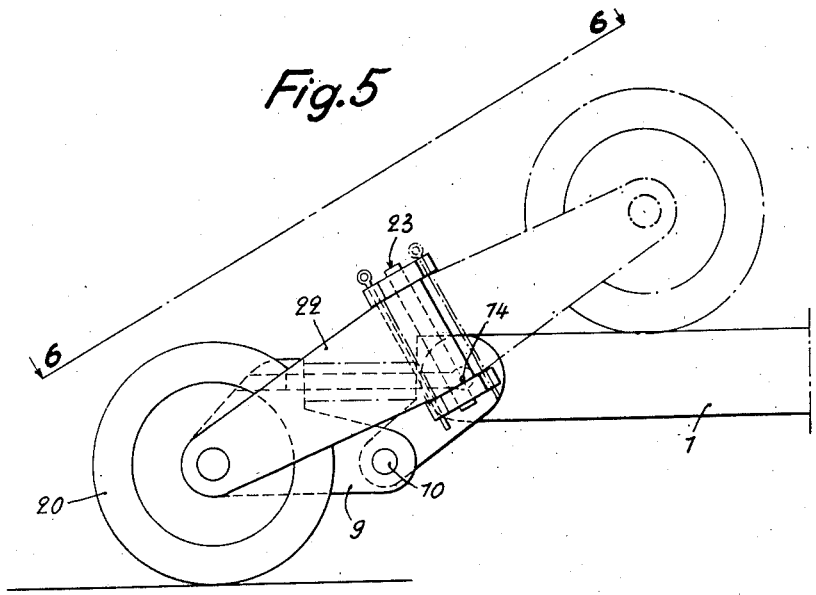
Fig. 5 is an elevation of an alternative embodiment.
Figure 6:
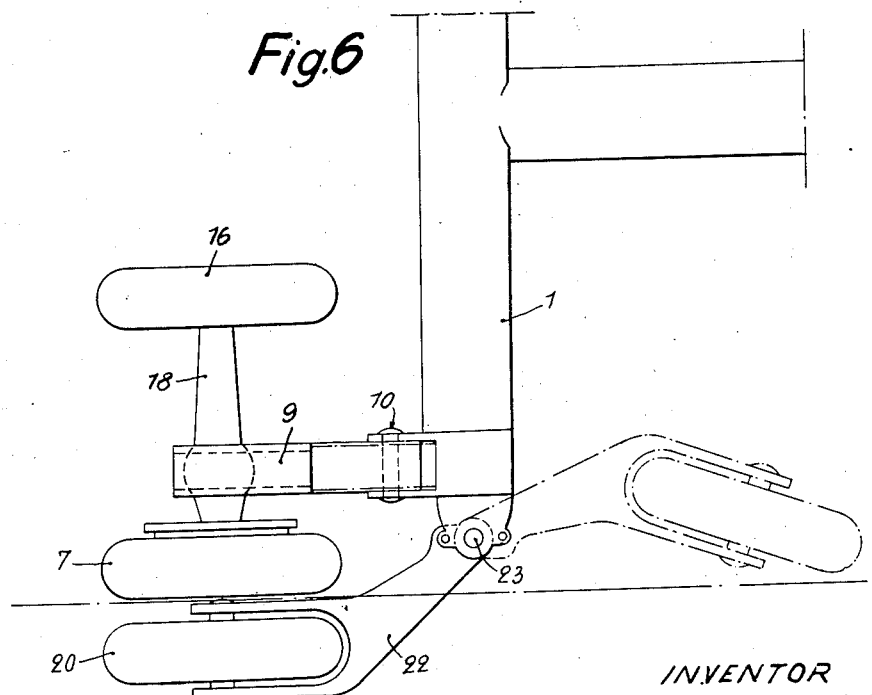
Fig. 6 is a plan view corresponding to Fig. 5.

In the alternative embodiment of Figs. 5 and 6, the additional wheels 20, 21 instead of being removably mounted at the end of shaft 18 are retractably mounted in corresponding yokes 22 pivoting on the frame 1 about inclined axes 23, so as to be able to occupy two positions, namely an operative position shown in full lines, in which the additional wheel is coaxial with the shaft 18, and a retracted position, shown in dots and dashes, in which the additional wheel is folded back alongside the frame, so as to be included within the regulation clearance required of the vehicle.

The reason for the slant given to the pin 23 is to prevent the friction of the tyre as the wheel is set from one position to the other, without the necessity of raising the vehicle with jacks.

The additional wheels may be maintained in each of these positions by any suitable locking means.

It will of course be understood that the invention is not limited to the constructional details herein described given by way of example only. Thus, the frame could be made in the form of a caisson, or of a triangular framework or the like, the number of carrier or of steering-wheels could be increased or reduced etc. The resilient suspending devices could be constituted by oleo-pneumatic devices.

Having now described my invention what I claim as new and desire to secure by Letters Patent is:

1. In a vehicle, a frame, a driving wheel, a lever pivotally connected to said frame, resilient suspension means disposed between said lever and said frame, a shaft carrying said wheel at one end and pivotally mounted at an intermediate point of its length on said lever, said shaft forming arms of different lengths, a loose carrier wheel disposed at the other end of said shaft, the leverage of the shaft arm carrying said driving wheel being shorter than the leverage of the shaft arm carrying said loose wheel, and a second loosely rotatable carrier wheel removably mounted in coaxial twinning position with said driving wheel.

2. In a vehicle, a frame, a driving wheel, a lever pivotally connected to said frame, resilient suspension means disposed between said lever and said frame, a shaft carrying said wheel at one end and pivotally mounted at an intermediate point of its length on said lever, said shaft forming arms of different lengths, a loose carrier wheel disposed at the other end of said shaft, the leverage of the shaft arm carrying said driving wheel being shorter than the leverage of the shaft arm carrying said loose wheel, a second loosely rotatable carrier wheel adapted to operate in coaxial twinning position with said driving wheel and a retractable support for said second loose wheel for bringing same to and from said twinning position.

3. A vehicle as claimed in claim 2, wherein said retractable support comprises a lever hinged to said frame about an inclined axis.

4. In a vehicle, a frame, a driving wheel, a lever pivotally connected to said frame, a shaft carrying said wheel at one end and pivotally mounted at an intermediate point of its length in said lever, said shaft forming arms of different lengths, a loose carrier wheel disposed at the other end of said shaft, the leverage of the shaft arm carrying said driving wheel being shorter than the leverage of the shaft arm carrying said loose wheel, and resilient suspension means disposed between said lever and said frame.

PIERRE JEAN MARIE THEODORE ALLARD.

REFERENCES CITED

The following references are of record in the file of this patent:

UNITED STATES PATENTS

| Number | Name | Date |
|---|---|---|
| 870,607 | Amberg | Nov. 12, 1907 |
| 907,847 | Molesworth et al. | Dec. 29, 1908 |
| 1,659,943 | Curtiss | Feb. 21, 1928 |
| 1,712,155 | Mistral | May 7, 1929 |
| 1,972,839 | De Graw | Sept. 4, 1934 |
| 1,984,565 | Bell | Dec. 18, 1934 |
| 2,255,347 | Brown | Sept. 9, 1941 |
| 2,263,107 | Smirl | Nov. 18, 1941 |

FOREIGN PATENTS

| Number | Country | Date |
|---|---|---|
| 308,802 | Germany | Oct. 26, 1918 |